Sept. 4, 1928.  
E. EDWIN  
1,683,534  
METHOD OF USING HIGH TENSION ELECTRIC ARCS FOR TREATMENT OF GASES  
Filed Aug. 24, 1925
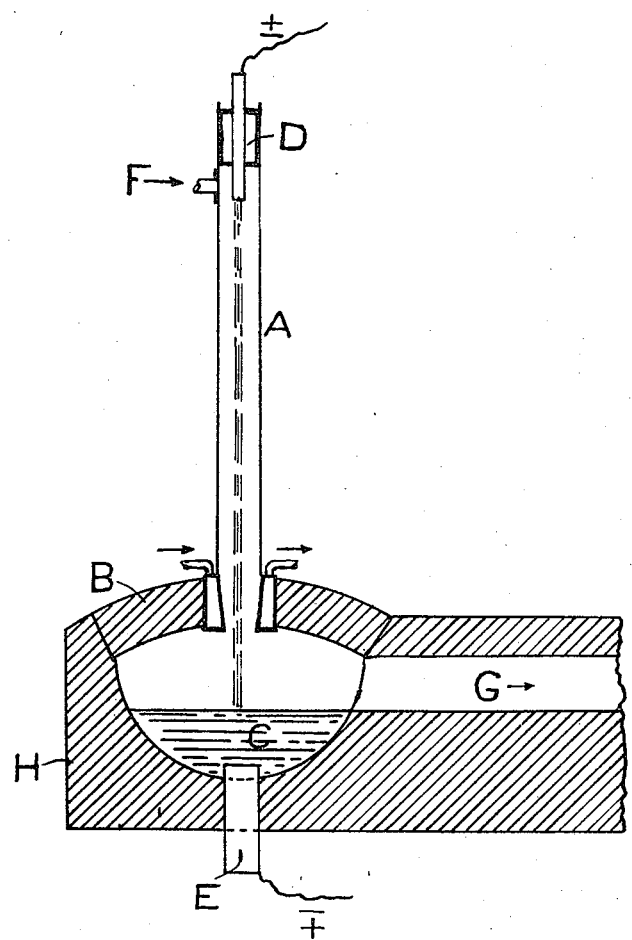

Patented Sept. 4, 1928.

1,683,534

UNITED STATES PATENT OFFICE.

EMIL EDWIN, OF TRONDHJEM, NORWAY, ASSIGNOR TO AKTIESELSKAPET NORSK STAAL ELEKTRISK-GAS-REDUKTION, OF TRONDHJEM, NORWAY.

METHOD OF USING HIGH-TENSION ELECTRIC ARCS FOR TREATMENT OF GASES.

Application filed August 24, 1925, Serial No. 52,200, and in Norway August 26, 1924.

It is known to use long stable electric arcs for carrying out several gas reactions. The manner of working generally in use is to strike the arc between solid conductors of metal, graphite or carbon. The surfaces between which the arc is burning are subject to severe corrosion from disintegration and oxidation and in order to prevent this attack as far as possible and to extend the life of the heads of the conductors the latter are provided with a cooling device. Particularly severe is the corrosion of the so-called hot electrode, i. e., the electrode in that part of the furnace, where the gases after passing the arc zone and possessing a very high temperature are leaving the furnace. In many cases, particularly when the electric flame as a consequence of specific physical conditions assumes an extremely high temperature f. inst. owing to the composition of the gases under treatment, or when the gases are treated under high pressure and the like, the cooling of the head of the electrode turns out to be quite insufficient. In spite of even the most efficient cooling the corrosion of the electrode, which increases with the flame temperature according to an exponential function of the latter, is so enormous that the life of the electrode very often only amounts to a few days or even hours, so that industrial work is impeded to the utmost extent. Moreover in many processes a cooling of the gases is quite undesired and are to be avoided.

According to my invention all inconveniences from corrosion of the electrode are removed, even without resorting to special cooling devices.

The invention consists in using as "hot" electrode a molten bath of heat-resisting oxides or salts or mixtures of such, hereinafter termed "slag". The current is supplied to the molten bath by means of solid conductors. Eventually the bath may be given an admixture of substances of high faculty for emission of electrons as for instance oxides of cerium, oxide of thorium and the like.

The invention is illustrated diagrammatically in the annexed drawing, representing a vertical section through an apparatus suitable for the purpose, The long upright flame-tube —A— is placed in the vault —B— of a container —H— for a molten slag bath —C—. The electric arc is burning between an upper "cold" electrode —D— and the bath —C—, the latter forming the "hot" electrode. The current is supplied to the slag bath by means of a conductor —E— for instance of graphite or the like. The gases to be treated enter the flame-tube in its upper part through the supply pipe —F— and are leaving the furnace through the flue —G— just above the surface of the bath. When the operation is to be started, the bath must already be in a molten state in order to be able to conduct the current. To this purpose the slag may be previously melted and introduced into the container —H— in the molten state. Or the melting of the slag may be carried out in the furnace by some heating device.

However the melting of the slag in the furnace may also be effected by means of the high-tension flame proper. In this latter case an auxiliary electrode is provisionally used for striking the arc until the slag is sufficiently conductive to allow the arc to be shifted over on the slag bath.

I claim:

1. The method of treating gases, which comprises drawing a high tension arc between an upper cold electrode and a lower hot molten electrode of heat-resisting and not materially volatilizable material by passing the gas along and around the arc from the cold electrode to the hot electrode, thereby supplying a greater quantity of heat to the gases.

2. In a high tension electric arc furnace of the tubular type for the treatment of gases, in which furnace a long arc is stabilized by means of gases circulating with high velocity around and along the arc; an upper cold electrode and a lower hot electrode of a molten bath of heat-resisting and not materially volatilizing substances.

3. In a high tension electric arc furnace of the tubular type for the treatment of gases, in which furnace a long arc is stabilized by means of gases circulating with high velocity around and along the arc; an upper cold electrode and a lower hot electrode of a molten bath of heat-resisting and not materially volatilizing substances containing rare earth oxides.

4. In a high tension electric arc furnace of the tubular type for the treatment of gases, in which furnace a long arc is stabilized by means of gases circulating around and along the arc; an upper cold electrode, and a lower hot electrode of a molten bath of heat resisting and not materially volatilizing material containing cerium oxide.

In testimony that I claim the foregoing as my invention I have signed my name.

EMIL EDWIN.